H. CARTER.
Fly-Traps.

No. 152,600.

Patented June 30, 1874.

Witnesses.
John Grist, Junr.
M. J. Whitty.

Henry Carter
Inventor
By his Attorney
Henry Grist

UNITED STATES PATENT OFFICE.

HENRY CARTER, OF AYLMER, CANADA, ASSIGNOR OF ONE-HALF HIS RIGHT TO DANIEL STEWART, OF SAME PLACE.

IMPROVEMENT IN FLY-TRAPS.

Specification forming part of Letters Patent No. 152,600, dated June 30, 1874; application filed April 20, 1874.

*To all whom it may concern:*

Be it known that I, HENRY CARTER, of Aylmer, in the county of Elgin, and Province of Ontario, in the Dominion of Canada, have invented a Fly-Trap, of which the following is a specification:

The invention consists in the arrangement and combination of a bait-chamber having open-ended thimble-orifices, and a perforated concave covering-plate, with a cage of rectangular form, in which the two sides of the cage facing the ingress-thimbles are covered with wire-cloth, and the two sides ending on the bait-chamber have wire-cloth openings to admit light at each end, the object being to attract the flies to the thimble-holes by the bait located in front, and to pass through the thimbles by the attraction of the light exhibited through the cage.

Figure 1:
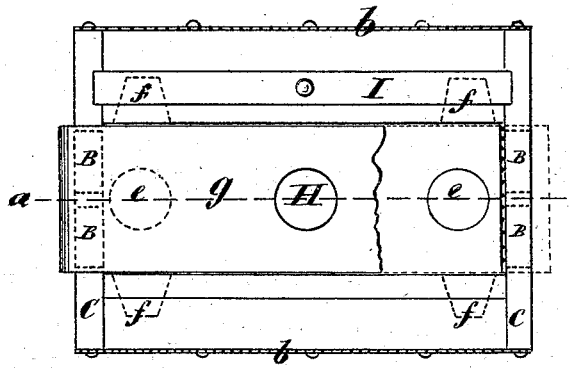
Figure 2:
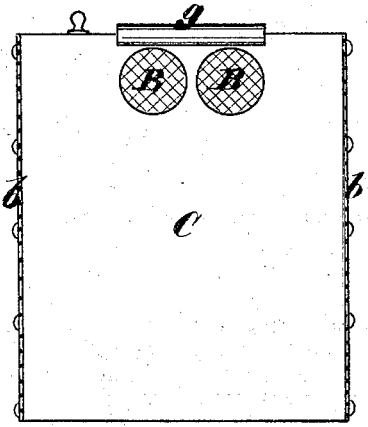
Figure 3:
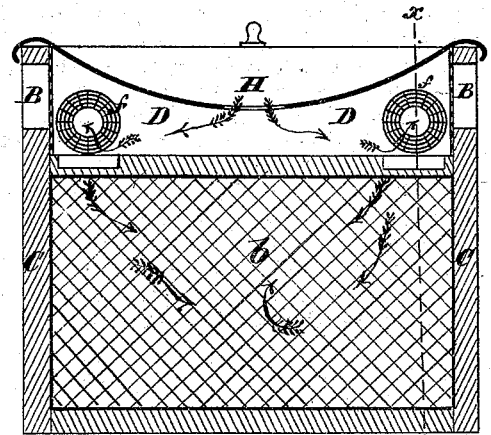
Figure 4:
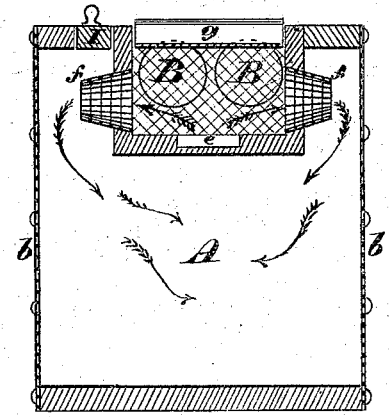

Figure 1 is a top view of my improved trap. Fig. 2 is an end elevation of the same. Fig. 3 is a vertical section on Fig. 1, on the line *a a;* and Fig. 4 is a vertical section on the line *x x*, Fig. 3.

A is the rectangular cage, the opposite sides *b b* covered with wire-cloth, and the ends *c c* are opaque, but having a wire-gauze opening or openings, B B, hereafter described. D is a bait-chamber formed within the cage, the recesses *e e* in the opaque bottom holding the bait. *f f* are wire-cloth thimbles, open at the tapering end, inserted in holes in the opaque side of the bait-chamber, and face the wire-cloth sides *b b* of the cage. The bait-chamber being in the cage, light is admitted thereto through the openings B B in the ends of the cage. The bait-chamber is covered with a metal plate, *g*, supported by its ends bearing on the ends of the cage. The plate *g* sinks in a concave form toward the bottom of the bait-chamber, and is provided with an aperture, H, through which the flies enter. The course of the flies entering the cage is indicated by arrows in the drawings, and the flies are attracted to follow that course by the bait, and the graduated increasing light shown through the cage. I is a close-fitting door, through which the flies are emptied from the cage.

I claim as my invention—

The combination, with the trap-body having the narrow longitudinal bait-chamber D and windows B B, of the thimbles *f f*, and the curved top plate *g*, having the entrance orifice H, all substantially as herein shown and described, for the purpose specified.

HENRY CARTER.

Witnesses:
W. A. E. MURRAY,
JOHN W. GILLET.